United States Patent [19]

Sirkar

[11] 4,287,088
[45] Sep. 1, 1981

[54] MULTI-STAGE FLUIDIZATION AND SEGREGATION OF USED CATALYST FRACTIONS

[75] Inventor: Amalesh K. Sirkar, Lawrenceville, N.J.

[73] Assignee: Hydrocarbon Research, Inc., Lawrenceville, N.J.

[21] Appl. No.: 68,370

[22] Filed: Aug. 21, 1979

[51] Int. Cl.³ .................... B01J 23/94; B01J 21/20; B03B 5/28; B03B 5/66
[52] U.S. Cl. .................... 252/414; 208/52 CT; 208/251 H; 209/158; 209/172; 252/412; 252/420
[58] Field of Search .............. 252/414, 420, 412, 413; 209/155, 157, 158, 159, 172, 172.5, 171, 173, 160; 208/52 CT

[56] References Cited

U.S. PATENT DOCUMENTS

| | | | |
|---|---|---|---|
| 2,429,436 | 10/1947 | Walker | 209/160 |
| 2,567,207 | 9/1951 | Hoge | 208/52 CT |
| 2,631,968 | 3/1953 | Peery | 209/172 |
| 2,688,401 | 9/1954 | Schmitkons et al. | 209/172 |
| 2,746,603 | 5/1956 | Blumdelle | 209/172.5 |
| 3,541,002 | 11/1970 | Rapp | 252/413 |
| 3,887,455 | 6/1975 | Hammer et al. | 209/158 |

Primary Examiner—P. E. Konopka
Attorney, Agent, or Firm—Vincent A. Mallare; Fred A. Wilson

[57] ABSTRACT

This invention provides a process and system for the segregation of used catalyst contaminated by the extended processing of hydrocarbon feedstocks. It utilizes multi-stage fluidization and segregation of the catalyst in an upflowing liquid, and recovery of the less contaminated catalyst upper fraction for reuse. The recovery vessel comprises at least two concentric compartments, either or both of which may preferably be tapered so as to provide less cross-sectional area at the upper end of the catalyst bed for improved fluidization of the used catalyst. The used catalyst material is usually introduced into the annulus between the vessel walls, and the lower density less contaminated fraction is accumulated within the inner compartment, from which it is withdrawn for reuse.

6 Claims, 6 Drawing Figures

MULTI-STAGE FLUIDIZATION AND SEGREGATION OF USED CATALYST FRACTIONS

BACKGROUND OF THE INVENTION

This invention pertains to the segregation of used contaminated catalyst into fractions according to particle density differences, and particularly to segregating and recovering such catalysts by fluidization with light liquids using multiple concentric compartments.

In a previous design catalyst segregation process to separate used catalyst contaminated by processing of hydrocarbon feedstocks into fractions according to particle density by liquid fluidization, a single vertical cylindrical vessel was provided having a flow distributor located at the bottom end for controlling the upflowing fluidizing liquid. However, a convenient arrangement was not provided for transfer of the segregated catalyst fractions from the segregator vessel, particularly for recovery of the segregated catalyst upper fraction having lower density and less particle contamination, for reuse.

The prior art has disclosed several processes for gas fluidization of used catalyst in hydrocarbon refining and hydrocracking systems. For example, U.S. Pat. No. 2,567,207 to Hoge discloses the classification of used catalyst according to particle size by fluidization in a classifier apparatus with hot flue gas from a regeneration step. Also, U.S. Pat. No. 2,631,968 to Peery discloses separation of used catalyst by a float-sink method using a liquid which is varied in density, with the less active catalyst overflowing the separation tank into a tray from which it is passed to a filtering step for removal of the liquid. However, a process which provides for separation of a less dense, more active catalyst fraction and its convenient transfer to a further fluidization and/or recovery step for reuse is needed in the catalytic processing industry.

SUMMARY OF THE INVENTION

The present invention provides an improved catalyst segregation process and system which performs both the segregation of used contaminated particulate catalyst by liquid fluidization in a first compartment to separate the more active reusable fractions, and the transfer of the separated upper less dense catalyst fraction into a second compartment or zone for recovery, all within a vertically oriented concentric compact segregator container assembly. The catalyst segregator assembly comprises a container having at least two vertically oriented concentric walled compartments and arranged to provide an annulus therebetween. Used catalyst is introduced into the first compartment, preferably into the annulus between the concentric walls, where it is fluidized by an upflowing light liquid and segregated into fractions according to particle density, with the liquid flowing upwardly from the bottom of the first compartment through the expanded catalyst bed. By placing the used catalyst in a column of upflowing light liquid having a selected specific gravity and viscosity range and under conditions producing gentle fluidization of the catalyst, substantial vertical segregation of the catalyst particles occurs according to their density and particle size. The lower density catalyst particles, which are less contaminated by metallic deposits, gradually migrate upward, while the heavier, more contaminated catalyst particles gradually settle downward toward the bottom of the bed as a result of the combined forces of the upflowing fluidizing liquid and gravity.

This invention is useful for segregating used catalysts within the particle size range of 10 to 100 mesh, preferably 20-50 mesh (U.S. Sieve Series), and having particle density within the range of 1.0 to 3.5 gm/cc. The catalyst particles may be any shape, such as chips, extrudates or spherical beads. The fluidizing liquid used can be any available light liquid having specific gravity within the range of 0.6 to 1.3, and is preferably a hydrocarbon process liquid fraction normally boiling between about 200°-450° F., such as kerosene, fuel oil, naphtha, and mixtures thereof. The fluidizing column length/diameter ratio (L/D) should be at least about 4/1 and usually need not exceed 50/1. The catalyst bed should be expanded sufficiently to achieve adequate segregation of the used catalyst, which is usually by at least about 20% of its settled height and need not exceed about 150% of its settled height. The fluidizing time should be at least about 5 minutes to accomplish a significant degree of catalyst segregation, and usually need not exceed about one hour.

After substantial segregation of used catalyst particles has occurred in the first compartment, the less dense and still active catalyst portion is further fluidized and lifted by upflowing fluid at higher velocity, and the catalyst fraction along with some liquid is transferred over the upper edge of the first compartment into the second compartment of the concentric multi-stage catalyst segregator container. Although the reaction liquid is usually washed from the catalyst by the fluidizing liquid, if desired this portion of still active catalyst can be further cleaned in the second compartment by washing with a solvent liquid, and then dried by passing a suitable gas through the bed. The cleaned and dried catalyst fraction is then removed from the second compartment for further processing or reuse.

As another embodiment of this invention, to provide for improved control of the catalyst bed expansion, the cross-sectional area of the fluidizing compartment or column can be varied by tapering one or both of the concentric walls of the first compartment so as to provide a smaller cross-sectional area at the upper end of the fluidized catalyst bed than at the bottom end. To provide for improved catalyst segregation results, the cross-sectional area of the upper end should be about 10 to 95 percent, and preferably between about 20 and 80 percent, of the cross-sectional area at the bottom end of the fluidized bed of catalyst. The walls of the catalyst segregation vessel should be tapered by an angle of at least about 2° and preferably 3°-8° from vertical, depending on the L/D ratio used for the first compartment. The area ratios, wall angles, and L/D ratio for the compartment are all related for a given maximum expansion of the catalyst bed.

Another alternative arrangement for the catalyst segregation system is to first place used catalyst into the inner compartment of a two-stage segregator unit and perform the initial segregation there, then transfer the less dense, more active catalyst portion into the annulus between the two compartments for washing and/or drying as needed, and then remove the clean catalyst from the bottom of the annulus. Such an alternative segregator vessel design for providing catalyst segregation inside the inner compartment may be simpler to control the degree of catalyst bed expansion than providing the catalyst bed in the annular space.

As a further embodiment of this invention, it is also contemplated that a multi-stage catalyst segregation assembly could be provided so that further catalyst particle segregation could be carried out on the catalyst fraction inside the second or inner compartment. This arrangement and procedure results in more complete segregation of the used catalyst to recover essentially all the active uncontaminated particles for reuse.

DESCRIPTION OF PREFERRED EMBODIMENTS

Figure 1:
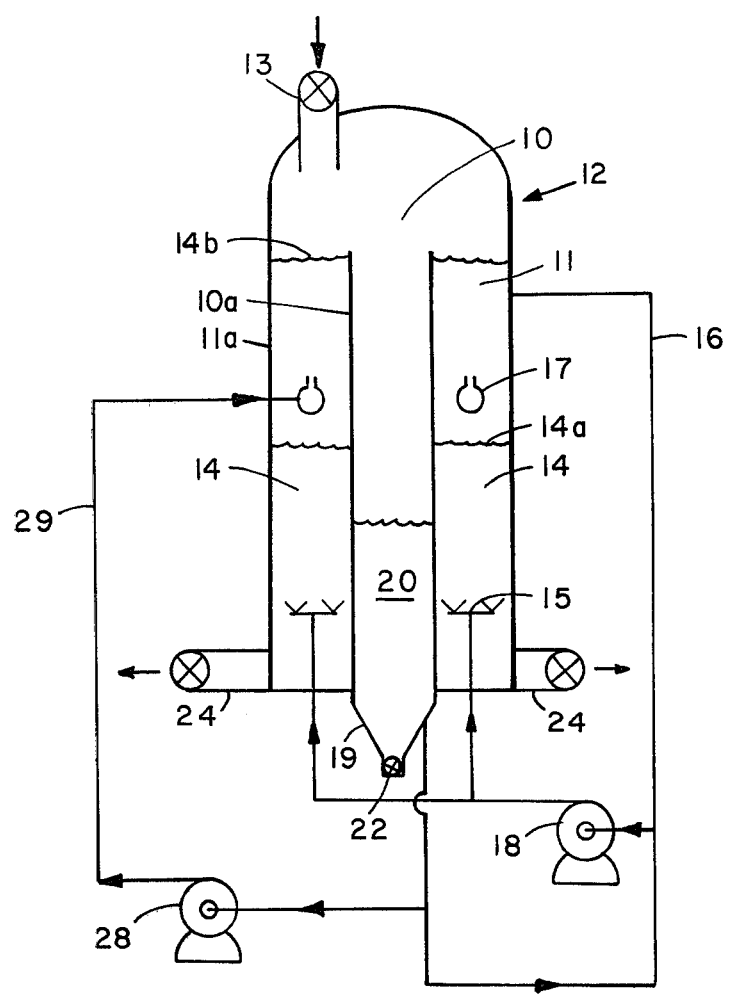
FIG. 1 is a diagram of a catalyst segregation system comprising two concentric compartments and means for circulation of a fluidizing liquid upward through a bed of used catalyst.

The catalyst segregator system as shown in FIG. 1 comprises two concentric compartments 10 and 11, one located inside the other in a container 12. Used catalyst is loaded through opening 13 into the annular compartment 11 of the unit between the two generally vertical walls 10a and 11a to provide catalyst bed 14. Segregation and cleaning of the used catalyst is performed by gentle fluidization using a suitable upflowing liquid fluidizing medium introduced into annulus 11 through flow distributor 15 located in the bottom of the annulus. The fluidizing medium is withdrawn from above the expanded bed 14 and circulated either through the inner compartment 10 or via external connection 16 to pump 18 for reuse.

The rate of segregation of used catalyst particles by liquid fluidization is dependent on several factors, including:

(a) Relative density of the catalyst particles
(b) Relative size of the catalyst particles
(c) Fluidizing liquid upflowing velocity
(d) Density of catalyst particles relative to density of fluidizing medium
(e) Length to diameter ratio of the fluidized bed.

Factors a and b are characteristics of the used catalysts being handled. The catalyst will preferably range between about 1.0 to 2.8 gm/cc density and 20 to 50 mesh particle size (U.S. Sieve Series), and it can be either cylindrical or spherical in shape. The superficial velocity of the upflowing liquid should be at least about 0.04 ft/sec and preferably within the range of 0.06 to 0.20 ft/sec to provide useful amounts of catalyst bed expansion and segregation. Factor d is dependent on the fluidizing medium used for catalyst segregation, and fluidizing liquid should preferably have a specific gravity within the range of about 0.65 to 1.2. Factor e depends on the specific design of the segregator compartments, and its L/D ratio will preferably range between 5 and 40. The static pressure in compartment 11 is usually 0–50 psig and temperature is usually within the range of 100°–450° F.

In addition to the catalyst segregation factors listed, it is noted that the degree of expansion of the catalyst bed is quite important, as increased bed expansion provides greater freedom of movement of individual catalyst particles (less interparticle collision), thus increasing the rate of segregation of used catalyst in the bed. The bed expansion should be at least about 20%, and need not exceed about 150% of its settled height.

Segregation of used catalysts in accordance with this invention may be carried out using various conveniently available fluidizing liquids. Successful catalyst segregation was performed experimentally by fluidizing the catalyst with No. 2 fuel oil and with water. Also, in commercial catalyst segregation processes, naphtha from catalytic petroleum processing can be used as a preferred catalyst fluidizing medium for segregation. Furthermore, segregation of used catalyst can be achieved using a mixture of hydrocarbon liquids such as fuel oil and naphtha, and thereby provide for varying the density and viscosity of the fluidizing medium in the optimization of desired catalyst segregation.

After the desired segregation of used catalyst has been achieved in bed 14 and the catalyst has been cleaned by the fluidizing liquid, the clean lower density segregated catalyst upper fraction is then transferred out of the annulus 11 over into the inner compartment 10 by increasing the upward flowing velocity of the fluidizing medium for a brief time, such as about 0.5 to 5 minutes. The amount or percentage of upper catalyst fraction transferred to the second compartment will depend mainly on the upflowing liquid velocity used, with the liquid velocity usually being temporarily increased by about 20–150 percent. Also, if desired, an additional upflow of a compatible fluidizing fluid can be provided in the upper portion of catalyst bed 14 from auxiliary distributor 17, located within the bed to further expand the upper portion of the bed. Such additional fluid supplied to distributor 17 may be the same liquid or a hydrocarbon gas supplied by pump 28.

After the desired upper portion of the catalyst bed 14 has been transferred over into the inner compartment 10, that transferred catalyst portion 20 is then dried by circulating a suitable drying gas, e.g., natural gas, refinery hydrocarbon vent gas, or an inert gas such as $CO_2$ or $N_2$ through the catalyst using connection 19. Next, the catalyst may be purged with nitrogen if needed to remove combustible gases, and the clean dry used catalyst fraction is withdrawn from the inner compartment at conduit 22. After the recovered catalyst transfer operation, the remaining fraction of the catalyst bed 14 containing heavy metal contaminants is removed from the annulus 11 at conduit(s) 24, and can be either processed to reclaim metals or discarded.

It is an advantage of this catalyst segregation system that the cleaned catalyst fraction 20 is washed with a solvent liquid in the same unit to remove heavy hydrocarbon process liquid coatings. An additional advantage of this catalyst segregator assembly is that it usually provides a greater length/equivalent diameter ratio than for either the inner or the outer container used alone. It should be noted that catalyst segregation by liquid fluidization is not as effective when performed in a shallow bed as compared to segregation in a deep bed, i.e. one having greater length/diameter ratio.

Figure 2A:
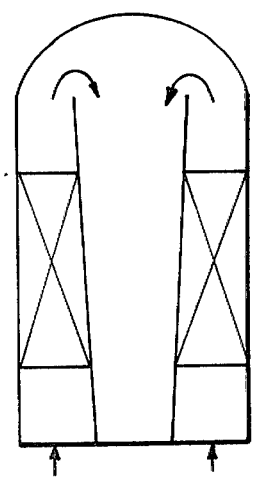
FIGS. 2A, 2B, and 2C illustrate alternative two-compartment catalyst segregation configurations wherein one or both compartment walls are tapered so as to provide reduced cross-sectional area at the upper end.
Figure 2B:
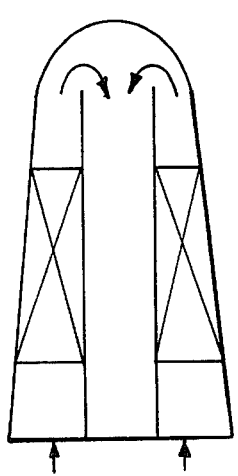
Figure 2C:
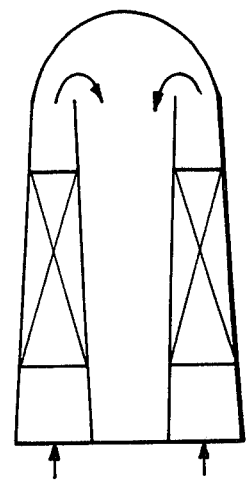

In an alternative catalyst segregator arrangement, a modification of the FIG. 1 embodiment can be advantageously used to better provide for a controlled and gradual catalyst bed expansion. As shown in FIGS. 2A, 2B, and 2C, modified segregator vessel configurations provide for tapering one or both the vessel walls, so as to provide smaller cross-sectional area at the upper end of the catalyst segregation column of between about 10 and 95% of the cross-sectional area at its lower end. Such taper should be at least about 2° and usually 3° to 8° from vertical, depending upon the L/D ratio used in the first compartment. This configuration provides for gradually increased catalyst bed expansion in the direction of reduced cross-sectional area and increased bed segregation.

Figure 3:
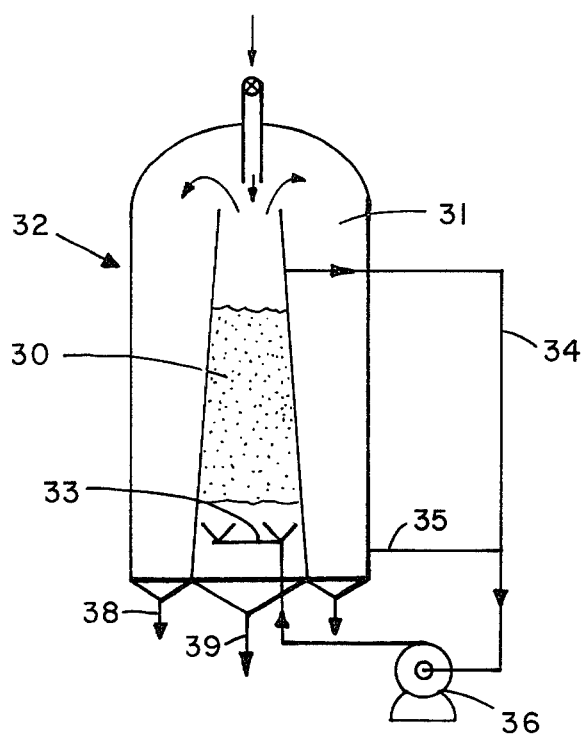
FIG. 3 shows an alternative catalyst segregation system in which the used catalyst segregation occurs in the inner compartment.

Another alternative arrangement for the catalyst segregator is shown by FIG. 3, wherein the spent catalyst is first placed into inner compartment 30 of a two-stage segregator vessel unit 32, and the initial segregation is performed therein by upflowing liquid fluidization, similarly to FIG. 1, using liquid circulated through flow distributor 33 by pump 36. After sufficient catalyst segregation is achieved in compartment 30, the bed is further fluidized briefly and the less dense clean catalyst upper portion is transferred over into the annular compartment 31 for washing and gas drying. The lower density and cleaned catalyst fraction is then removed from the bottom of outer compartment 31 via conduit(s) 38. The remaining lower fraction of catalyst bed 30 containing increased metal deposits is removed from inner compartment 30 via conduit 39.

Such an alternative vessel design for providing catalyst segregation inside the inner compartment, as shown by FIG. 3, usually provides for improved control of the fluidized bed of catalyst. Also, if desired, the wall of inner compartment 30 can be tapered so as to provide reduced cross-sectional area at the upper end of about 60 to 95% of the cross-sectional at the bottom of the compartment, similarly as described for the FIG. 2 configurations.

Figure 4:
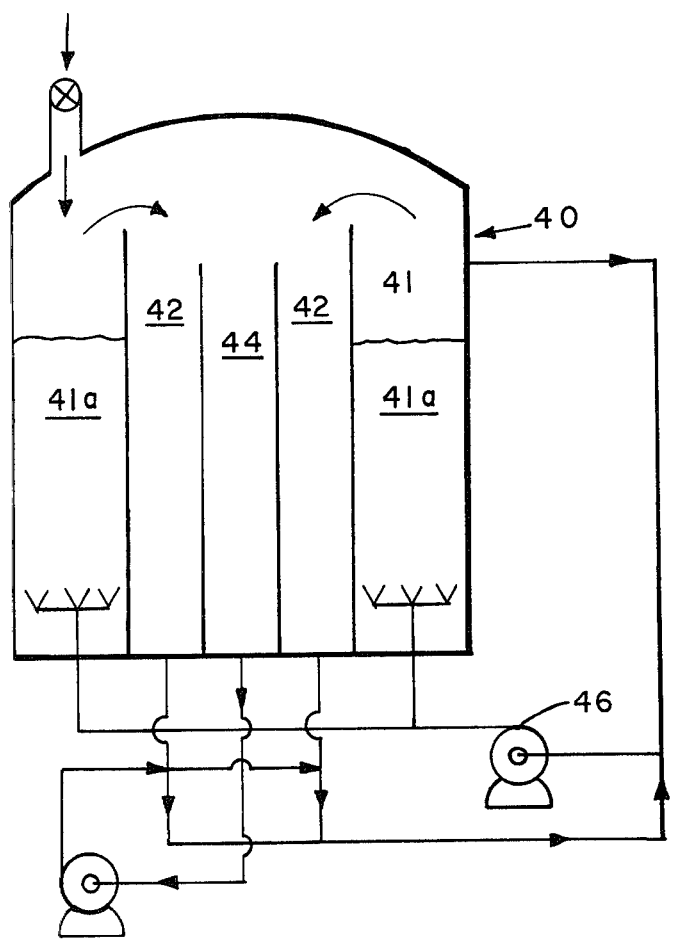
FIG. 4 shows a multiple-stage catalyst segregation system in which further segregation of catalyst fractions is performed.

It was found in laboratory experiments using small size catalyst segregation apparatus that very sharp separation between lighter and heavier catalyst particles can be achieved using a small quantity of used catalyst. However, in commercial size catalyst segregators handling large quantities of used catalyst such sharp catalyst separation may not be achieved in one segregation step. To improve the catalyst segregation achieved in such a large commercial size segregator, more than one stage of segregation may be required. Thus, regarding the design of the catalyst segregator units disclosed in FIGS. 1, 2, and 3 consisting of two concentric cylindrical vessels, further catalyst segregation can be carried out inside the second compartment. Such multi-stage segregation of used catalyst using additional beds is shown by FIG. 4 and is described below.

Using such a multi-stage vessel assembly 40, catalyst segregation is first carried out by placing used catalyst in the outermost annulus or compartment 41, and circulating the fluidizing medium upwardly through it to segregate the catalyst according to particle density. Then the upper half of the segregated bed 41a is transferred over into the next inner annulus 42 by increasing the fluidizing medium upward velocity in annulus 41. After such initial segregation of used catalyst has been performed in outer annulus 41, the original bed is separated into two approximately equal portions. Following that step, the two portions are further segregated. Then 80–90% of the resegregated upper half in annulus 42 and 10–20% of the resegregated lower half catalyst remaining in annulus 41 are recovered. By doing this, the overall catalyst segregation efficiency is improved for recovering almost all of the lighter less contaminated catalyst particles.

The fluidizing medium will be flowing through both the outermost and the next inner annulus 42. Following such resegregation, a desired percentage of resegregated upper half catalyst would be transferred to the innermost cylinder 44 and recovered, while the remainder of the resegregated upper half catalyst would be discarded. Next, a desired percentage of the resegregated lower half of the bed would be transferred from the outermost annulus to the next inner annulus and eventually recovered, while the rest of the resegregated lower half of the bed will be discarded.

This invention will be further illustrated by reference to the following typical example of catalyst segregation by fluidization using a light liquid in multi-stage compartments. The example is intended to be illustrative only and should not be construed as limiting in scope.

EXAMPLE

A used catalyst charge consisting of 1000 pounds of spent catalyst (cobalt-molybdate on alumina) extrudates having particle size within the range of 20–50 mesh and loaded with vanadium, nickel, sulfur, and coke impurities from petroleum processing operations is placed in the annular outer compartment of a two-stage cylindrical catalyst segregator vessel configuration, similar to that shown in FIG. 1. The particle size of the spent catalyst is between +20 to 50 mesh size (U.S. Sieve Series); average particle density is 1.46 gm/cc and it has an average metal content of 2.734 (V+Ni)/Mo. The segregator vessel dimensions are 2.5 ft. inside diameter for the inner wall and 3.1 ft. inside diameter for the outer wall; height of the inner wall is 10.25 ft. and height of the outer wall is 12 ft. The fluidizing liquid flow distributor in the annulus is located about 1 ft. above the bottom of the vessel. These dimension provide an equivalent L/D ratio of about 32 for a 100 percent expanded catalyst bed in the annulus.

Catalyst bed expansion of 100 percent over its settled height is provided by a linear upward velocity of about 0.11 ft/sec with water as the fluidizing liquid at ambient temperature and pressure conditions. With 100% bed expansion and after fluidizing the catalyst for a suitable time period, such as 0.1–0.5 hours, the following catalyst segregation is obtained. Particle density of the spent catalyst varies from 1.84 gm/cc for the bottom portion to 1.28 gm/cc at the top of the bed for +20 mesh catalyst extrudates. This degree of catalyst segregation corresponds to metal contents of 3.94 (V+Ni)/Mo for catalyst in the bottom portion of the bed and 1.32 at the top.

After having obtained the desired amount of catalyst segregation, the bed is further expanded by increasing the superficial velocity of the upflowing water fluidizing medium from about 0.11 to about 0.26 ft/sec for 1–5 minutes, so that about 50% of the segregated catalyst bed is transferred from the annulus over the top edge into the inner compartment. The superficial liquid velocities needed for such further fluidizing the lower density less contaminated upper fraction of catalyst from the first compartment and transferring it over into the second compartment is shown by Table 1, using water as the fluidizing liquid.

TABLE 1

| SUPERFICIAL VELOCITY OF UPFLOWING WATER, FT/SEC | UPPER FRACTION OF CATALYST BED TRANSFERRED, % |
| --- | --- |
| 0.11 | 0 |
| 0.16 | 17 |
| 0.20 | 30 |
| 0.26 | 50 |

Thus, the lower density catalyst fraction having lower metals content is transferred to the inside container for recovery and reuse in the process, while the higher density catalyst fraction having higher metal content is left behind in the annulus.

Although I have disclosed certain preferred embodiments of my invention, it is recognized that modifications can be made thereto and that some features can be employed without others, all within the spirit and scope of the disclosure, as defined solely by the following claims:

What I claim is:

1. A process for segregating used contaminated catalyst, comprising the steps of:
   (a) introducing the used catalyst into a first compartment of a concentric walled container, said first compartment having an upper end which has a cross-sectional area of 10 to 95 percent of that of the lower end of said first compartment;
   (b) fluidizing the catalyst in said first compartment with an upflowing liquid to achieve segregation of the used catalyst particles to provide a lower density less contaminated fraction at the compartment upper end, and a greater density more contaminated catalyst fraction at the compartment lower end;
   (c) further fluidizing the catalyst bed and transferring the less contaminated upper fraction over the top of the first compartment into a second compartment;
   (d) withdrawing the less contaminated catalyst fraction from the second compartment; and
   (e) withdrawing the more contaminated catalyst fraction from the first compartment.

2. The process of claim 1 wherein the first compartment is the outer annular space between two concentric walled containers, and the second compartment is the inner compartment.

3. The process of claim 1 in which the lower density catalyst portion transferred into the second compartment is dried therein by a gas, prior to withdrawal of the dried catalyst therefrom.

4. The process of claim 1 wherein the used catalyst has average particle density of 1.0 to 3.0 gm/cc and is fluidized by a light hydrocarbon liquid fraction having specific gravity of 0.6 to 1.3.

5. The process of claim 1 wherein the upper 30-70 percent fraction of the catalyst bed in the first compartment is transferred to the second compartment by further fluidization of the bed.

6. A process for segregating used contaminated catalyst in a two-compartment container, comprising the steps of:
   (a) introducing the used catalyst into the inner compartment of the two concentric walled container, said inner compartment having an upper end which has a cross-sectional area of 10 to 95 percent of that of the lower end of said inner compartment;
   (b) fluidizing the catalyst in said inner compartment with an upflowing liquid to achieve segregation of the used catalyst particles into a lower density, less contaminated fraction at the compartment upper end, and a greater density, more contaminated catalyst fraction at the compartment lower end;
   (c) further fluidizing the lens contaminated upper fraction of catalyst and transferring it over the top of the inner compartment into the outer annular compartment;
   (d) withdrawing the less contaminated catalyst fraction from the outer compartment; and
   (e) withdrawing the remaining more contaminated catalyst fraction from the inner compartment.

* * * * *